United States Patent [19]

Arff

[11] Patent Number: 4,579,141

[45] Date of Patent: Apr. 1, 1986

[54] FILLING AND DISCHARGING VALVE FOR INFLATABLE HOLLOW BODIES

[75] Inventor: Heino Arff, Hamburg, Fed. Rep. of Germany

[73] Assignee: ITW-Ateco GmbH, Norderstedt, Fed. Rep. of Germany

[21] Appl. No.: 524,702

[22] Filed: Aug. 19, 1983

[30] Foreign Application Priority Data

Aug. 19, 1982 [DE] Fed. Rep. of Germany ....... 3230780
Jun. 1, 1983 [DE] Fed. Rep. of Germany ....... 3319869

[51] Int. Cl.⁴ .................. F16K 15/18; F16K 15/20; F16K 31/56
[52] U.S. Cl. ................... 137/223; 137/522; 137/543.17; 251/75; 251/82; 251/86; 441/41
[58] Field of Search ............ 137/522, 543.17, 223, 137/231; 251/14, 75, 82, 86; 441/41

[56] References Cited

U.S. PATENT DOCUMENTS

| | | | |
|---|---|---|---|
| 2,228,984 | 1/1941 | Broecker | 137/231 |
| 2,242,569 | 5/1941 | Crowley | 137/543.17 |
| 2,652,857 | 9/1953 | Engstrom | 251/75 |
| 2,756,761 | 7/1956 | Cook | 251/75 |
| 2,772,692 | 12/1956 | Russell | 251/82 |
| 2,998,022 | 8/1961 | Russell | 137/223 |
| 3,142,850 | 8/1964 | DeBoer | 441/41 |
| 3,155,367 | 11/1964 | Gifford | 251/86 |
| 3,264,884 | 8/1966 | Brooker | 251/75 |
| 3,504,849 | 4/1970 | Quinn | 251/75 |
| 3,540,473 | 11/1970 | Peterson et al. | 137/543.15 |
| 4,015,622 | 4/1977 | Pagani | 137/223 |
| 4,146,070 | 3/1979 | Angarola et al. | 137/223 |
| 4,305,425 | 12/1981 | Mackal et al. | 137/543.17 |

FOREIGN PATENT DOCUMENTS

| | | | |
|---|---|---|---|
| 704055 | 2/1965 | Canada | 137/223 |
| 1048826 | 11/1966 | United Kingdom | 251/86 |

Primary Examiner—Alan Cohan
Assistant Examiner—John A. Rivell
Attorney, Agent, or Firm—J. R. Halvorsen; A. J. Brunett; T. W. Buckman

[57] ABSTRACT

Filling and discharging valve for inflatable hollow bodies, particularly dinghies, comprising a valve housing having a radial flange adapted to be attached to the inflatable body and a valve seat facing the interior of the inflatable body, the valve seat co-operating with a plate-like valve member. A spring is located within the valve housing and biasing the valve member towards the closed position thereof. Holding means hold the valve member in the opened position. A dead center spring above the valve member includes a dead center spring which is secured to the circumference of the valve housing. The dead center spring holding the valve member in its close position above the dead center and holds the valve member in its opened position below the dead center.

8 Claims, 4 Drawing Figures

FILLING AND DISCHARGING VALVE FOR INFLATABLE HOLLOW BODIES

The invention refers to a filling and discharging valve for inflatable hollow bodies, particularly for dinghies, comprising a valve housing adapted to be fastened to the inflatable body by means of a radial flange, and comprising a valve seat facing the interior of the inflatable body, said valve seat co-operating with a plate-shaped valve member, a spring located in the valve housing and biasing the valve member in the closing direction thereof, and holding means adapted to hold the valve member in its opened position.

Filling valves for inflatable dinghies or the like are usually self-closing, i.e. so-called one-way valves, the valve body thereof moving in its opened position upon supply of pressurized air and immediately closing the valve if the supply of pressurized air is cut off. The valve members are normally diaphragms of flexible material or plate-like elements. In order to discharge the air out of the hollow body the valve member is opened by pressing down a pin attached to the diaphragm. It is also known to open a discharge valve by an extension on a closing plug for the filling valve (German laying open letter No. 20 20 302).

It is further known to rotatably support a pin connected to the diaphragm on the valve member (German laying open letter No. 25 48 297 or German utility model No. 27 16 654). In the latter case the diaphragm includes a rigid core of plastic material having an upwardly protruding extension. During normal operation the extension is protruding beyond the opening of the valve body to allow that the diaphragm engages the valve seat. By axial displacement of the pin against a spring the extension is brought out of engagement with the opening so that the diaphragm can be rotated about its axis in order to keep it in the opening position thereof. In the last-mentioned embodiment the pin includes a traverse pin which is axially displaceable within an elongated slot of the valve member. If the pin is sufficiently axially displaced against a spring, the traverse pin can be pivoted and brought below an abutment in order to hold the valve in its opened position.

Both mentioned embodiments enable the use of a discharging pump in order to discharge the hollow body quickly and completely. The structure of the valves is relatively expensive. Above all they require a metallic spring in order to exert a biasing force on the valve member towards its closed position. These springs are normally spring coils which are exposed to corrosion, particularly if used in connection with valves for inflatable dinghies. A further disadvantage in connection with the known valve structures is the relatively large number of individual parts and the expensive assembling thereof.

Object of the invention is to provide a filling and discharging valve for inflatable hollow bodies, particularly for dinghies, which is comprised of a minimum number of parts and can be simply made and assembled.

This problem is solved in that above the valve member a dead center spring is connected thereto, the spring being fixed to the valve housing at the periphery thereof and holding the valve member in its opened and closed positions above and below the dead center, respectively.

The valve member of the valve according to the invention is biased in its closed position by the dead center spring. If the valve member is axially displaced in its opened position the dead center spring is snapping over the dead center and holds the valve member in its opened position under biasing force. The air is permitted to drain out of the hollow body and/or can be discharged by a pump. By simply grasping the dead center spring the spring is allowed to snap over again in order to bias the valve in its closed position. Upon an inflation by a pump which is normally equipped with a check valve, the valve member can be closed by the gas or the air within the hollow body if the pressure thereof is sufficient. The pressure difference on the valve member then is sufficient to overcome the biasing force of the dead center spring and to move the valve member towards its closed position.

Thus, the dead center spring of the filling and discharging valve according to the invention is not only a closing spring for the valve but also a retaining member for attaching the valve element to the valve housing. Finally, the dead center spring has the function to hold the valve member in its opened position. It is clear that due to the three functions of the dead center spring of the valve according to the invention the valve can consist of a minimum number of parts which can be simply made and assembled.

As already mentioned, an interconnection between the dead center spring and the valve member is required. An embodiment according to the invention suggests that the valve member is provided with an axially extending centrally disposed rod co-operating with the dead center spring. The rod may extend beyond the dead center spring in order to allow a manual displacement of the valve member to its closed or opened position, respectively.

The dead center spring may be for instant formed by an arcuate diaphragm, the outer periphery thereof being fixed to the valve housing and connected to the valve member at the center thereof. It is however preferred according to a further embodiment of the invention that the dead center spring includes a retaining ring which is axially secured in the valve housing and connected with the valve member through flexible resilient arms, the arms being S-like shaped in the closed position of the valve. Vis-á-vis a diaphragm the arms have the advantage that they show a significant dead center behavior and allow a large effective cross-section for the flow of fluid.

Dead center spring and valve member can be integrally formed of plastic material and thus reducing the number of parts considerably. The assembling of the integral part is preferably from above. However, it requires a special shape of the valve plate and the remaining parts. Thus, a further embodiment of the invention provides that the rod includes an enlargement intermediate its length and is connected to a central receiving section by a releasable snap-type connection, said receiving section is shown as a generally expandable tubular means including an intermediate recess adapted to accept and retain the rod enlargement and having the spring arms connected exteriorly thereto. The dead center spring on the one side and the valve member on the other side are thus two separate parts which can be connected together by said snap-type connection. During assembling the valve member is below the dead center spring within the valving house which is already fixed to the hollow body while the dead center spring will be inserted from above. By pressing both parts towards each other they are connected to a unit.

There are different structural possibilities to design a snap-type connection between the mentioned parts. An embodiment of the invention provides that the receiving section comprises a ball-shaped seat the entrance opening thereof being of a smaller diameter than the seat diameter and the wall of which comprising at least one resiliently yielding section, with the rod having a spherical enlarged intermediate section adapted to be snappingly introduced into the seat. The seat defines a ball-type cup in which the ball on the rod is positively received. Thus, the rod is allowed to carry out a small movement relative to the seat or the receiving section, respectively, or to the valve housing, which is advantageous for a uniform engagement of the valve member on the valve seat.

According to a further embodiment of the invention the receiving section is provided with a throughbore and the rod is provided with an extension adapted to be extended through the throughbore and manually gripped from outside. During assembling the extension can be manually gripped in order to connect the rod to the receiving section. The extension has a reduced cross-section so that it can be removed afterwards by shearing or breaking it off.

The resilient arms are as mentioned S-like shaped. Preferably, three resilient arms are provided arranged in uniform distances from each other. According to a further embodiment of the invention the connection of the resilient arms to the valve member and/or to the retaining ring is of a hinge-like nature. The link-like connection effects that the essential spring force is generated by compression of the S-like arms. By this a progressive displacement force towards the dead center is achieved from the end positions in both displacement directions. Upon reaching the dead center the resilient arms automatically snap over in order to displace the valve member in the other end position.

In order to facilitate the assembling and to improve the sealing properties a further embodiment according to the invention provides that a ring of elastomeric sealing material is fitted in the bore of the valve housing having the dead center spring fixed thereat and the valve seat formed thereat. During assembly the sealing ring in the valve member can be inserted in the housing first. Afterwards the retaining ring which is preferably also resilient can be inserted in the bore together with the receiving section. The tap of the valve member then is snapping into the seat of the receiving section.

In connection with the embodiment explained last a further embodiment of the invention provides that a downwardly and upwardly facing annular groove is respectively formed in the bore of the valve housing with corresponding annular extensions of the sealing ring facing each other engaging therein. By this the sealing ring is axially secured in both directions and defines a plurality of sealing edges with the housing.

The provision of a sealing ring has the further advantage that according to a further embodiment of the invention the outer surface of the sealing ring is shaped complementary to the associated wall of the bore of the housing.

An embodiment according to the invention is explained hereafter in connection with drawings.

Figure 1:
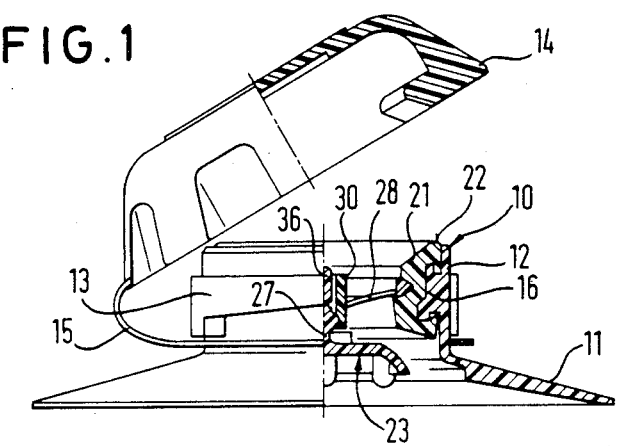
FIG. 1 shows a section through a valve in its opened position according to the invention.
Figure 2:
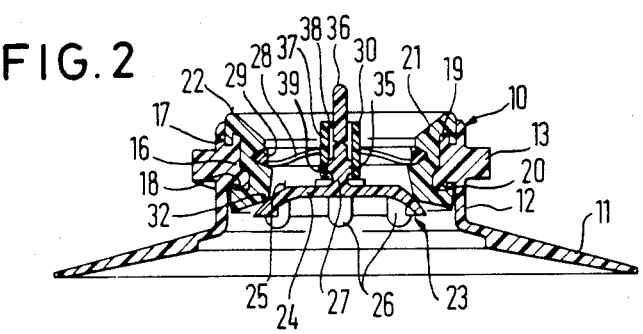
FIG. 2 shows a similar view as FIG. 1, however, in the closed position of the valve.

In FIGS. 1 and 2 a valve housing 10 is shown including a frusto-conical annular flange 11 and a cylindrical portion 12. The flange 11 for instance is bonded to the outer side of a dinghy. The cylindrical portion 12 has a quick-type thread 13 on the outer circumference thereof on which a lid 14 can be screwed (FIG. 1), the lid being linked to the valve housing 10 through a band 15.

The cylindrical portion 12 has an annular projection 16 on the inner side thereof, a groove 17 being formed in the upper side of the projection and an annular groove 18 being formed in the lower side thereof. By this two axially extending annular projections 19, 20 are formed. The annular projection forming a centralized bore having a predetermined diameter.

An annular sealing ring 21 is inserted in the cylindrical portion 10, the outer circumference of the sealing ring 21 being complementary to the contour of the inner wall of the cylindrical portion, i.e. by sections engaging the grooves 17, 18 and a surface accommodating to the contour of the projection 16. Only the lower section engaging the lower groove 18 has some clearance relative to the wall in order to facilitate the insertion of the sealing ring 21. The sealing ring 21 is projecting outwardly partially beyond the cylindrical portion 12 and forms a sealing seat 22 sealingly engaged by the inner wall of the lid 14, if the lid is screwed onto the thread 13.

Figure 3:
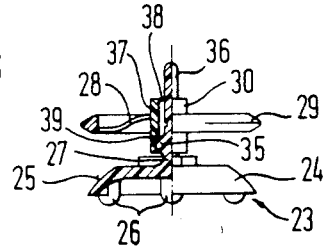
FIG. 3 shows the valve member of the valve according to FIGS. 1 and 2 in section and elevation view already assembled with a retaining ring.
Figure 4:
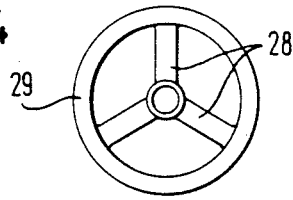
FIG. 4 shows a view on the part according to FIG. 3.

A valve member 23 is located within the valve housing 10, the structure thereof will be more clearly seen in the FIGS. 3 and 4.

The valve member 23 has a valve plate 24 including a conical or ball-type sealing flange 25. A plurality of rounded downwardly facing projections 26 are formed to the valve plate 23 uniformly spaced from each other. A tap 27 is centrally located on the upper side of the valve plate 24. The tap includes a ball-like portion 35, an extension 36 extending from a ball-like portion 35 upwardly. Further a retaining ring 29 is provided the cross-section thereof being nearly triangular, three resilient arms 28 being formed to the inner side of the retaining ring having a uniform distance from each other. The resilient arms 28 are radially inwardly connected to a sleeve-like receiving section 37 having a throughbore 38 and a ball-type seat 39, an entrance portion joining to the seat 39. The entrance portion narrows upwardly to a throat to which the ball-type seat is joining.

The assembly of the arrangement according to FIGS. 1 and 2 can be carried out as follows. First the valve member 23 is inserted in the housing 20 already bonded to the hollow body. Thereafter the sealing ring 21 is assembled. Thereafter the retaining ring 29 is snappingly inserted in the annularly recessed inner wall of the sealing ring 21 whereby it is axially secured. In the closed position of the valve member 23 according to FIG. 2 it can be seen that the resilient arms 28 are S-like bent and bias the valve member 23 towards the closed position due to the inherent compression force. The connection of the resilient arms 28 to the retaining ring 29 and the receiving section 35 is hinge-like so that the bias force substantially is effected by a compression force.

By means of an air pump or bellows air can be blown through the shown valve into the hollow body (not shown). The arms 28 yield as much as the valve plate 24 is moved away from the seat 32 by the blow pressure. If the blow pressure stops the valve plate again engages the valve seat, the engaging force of the valve plate 25 increasing with increasing pressure within the hollow body.

If the air is to be discharged from the hollow body the tap 27 can be forced downwardly through the receiving section 35 by tipping a finger on it. The arms 28 behave like a dead center spring and retain the valve member 23 in the position according to FIG. 1 after snapping over the dead center. The air can be drained from the hollow body or can be pumped out, respectively.

If the valve according to FIG. 1 is to be brought in a closed position the receiving section 30 can be gripped and pulled upwardly so that the valve member 23 reaches the position shown in FIG. 2. Also during inflation by means of a pump or bellows which have a check valve, an immediate closing of the valve is occurring after some air is introduced in the hollow body if the fitting of the pump is removed from the valve. A small portion of air will flow into atmosphere, however, the pressure difference on the valve member 23 is completely sufficient to move the valve member 23 from a position according to FIG. 1 to a position according to FIG. 2. The same happens also if the valve member 23 will be brought into the stable opened position according to FIG. 1 during the filling up of the hollow body.

The projections 26 on the valve member 23 prevent the skin of the opposite side of the inflatable hollow body from engaging the concave side of the valve member and affecting the sealing function thereof.

The individual parts of the filling and discharging valve according to the FIGS. 1 to 4 are made of suitable plastic material. It is understood that the material of the retaining ring having the resilient arms must provide sufficient spring-like properties. The material of the sealing ring 21 is softer than the material of the valve member 23, the valve housing 10 and the retaining ring 29. Thus, the softer material of ring 21 facilitates its introduction into housing 10 as well as its acceptance of ring 29 during assembly.

I claim:

1. A plastic filling and discharge valve for inflatable hollow bodies comprising a valve housing including an enlarged tapered radial flange capable of being fastened to the inflatable body, said housing further including a frustoconical generally concave centrally apertured valve seat having a predetermined diameter facing the interior of the inflatable member, a plate-shaped valve member having a depending continuous curvilinear peripheral skirt means larger than said predetermined diameter and forming a concave underside facing said interior of the inflatable hollow bodies and a convex upper surface for engaging said valve seat, a dead center spring having a holding ring (29) seated axially and secured in the valve housing (10), and holding means for holding the valve member in an opened position having a centrally located axially disposed rod (27), said rod (27) being connected to a central tubular reception portion (35) via a separable snap type connection, said dead center spring having flexible resilient arms (28) extending radially inward from said holding ring, integral with said tubular reception portion (35) and bent to an S-shape to bias the valve member (23) in the closed position.

2. A valve according to claim 1, characterized in that the tubular reception portion (35) comprises a recessed ball-shaped seat the entrance opening of which being of a smaller diameter than the seat diameter and the wall of said tubular portion includes at least one resiliently yielding section, and said rod (27) having an enlarged sperical section intermediate its ends which is adapted to be snappingly introduced into the seat.

3. A valve according to claim 2, characterized in that the tubular reception portion is provided with a throughbore and the rod (27) is provided with an extension (36) adapted to be guided through the throughbore and extends beyond said tubular portion (37) capable of being seized from outside said tubular portion.

4. A valve according to claim 1, characterized in that the integral connection of the arms (28) at the tubular reception portion and the holding ring (29) is of a hinge-like nature.

5. A valve according to claim 1, characterized in that a ring (21) of elastomeric sealing material is fitted in the bore of the valve housing (10) and has the dead center spring fixed therein and the valve seat (32) formed thereon.

6. A valve according to claim 5, characterized in that a downwardly and upwardly facing annular groove (17,18) is respectively formed in spaced relation adjacent the bore of the valve housing (10) with corresponding annular extensions (19,20) of the sealing ring (21) facing each other engaging therein.

7. A valve according to claim 6, characterized in that the outer circumferentially disposed surface of the sealing ring (21) is shaped complementary to the associated wall of the bore of the valve housing (10).

8. A valve according to claim 7, characterized in that the upper end of the sealing rin (21) is formed as a sealing seat (22) adapted to be brought into sealing engagement with a valve cover (14).

* * * * *